US011355103B2

(12) United States Patent
Rao

(10) Patent No.: US 11,355,103 B2
(45) Date of Patent: Jun. 7, 2022

(54) UNSUPERVISED KEYWORD SPOTTING AND WORD DISCOVERY FOR FRAUD ANALYTICS

(71) Applicant: PINDROP SECURITY, INC., Atlanta, GA (US)

(72) Inventor: Hrishikesh Rao, Atlanta, GA (US)

(73) Assignee: PINDROP SECURITY, INC., Atlanta, GA (US)

(*) Notice: Subject to any disclaimer, the term of this patent is extended or adjusted under 35 U.S.C. 154(b) by 211 days.

(21) Appl. No.: 16/775,149

(22) Filed: Jan. 28, 2020

(65) Prior Publication Data
US 2020/0243077 A1 Jul. 30, 2020

Related U.S. Application Data

(60) Provisional application No. 62/797,814, filed on Jan. 28, 2019.

(51) Int. Cl.
*G10L 15/197* (2013.01)
*G10L 15/04* (2013.01)
(Continued)

(52) U.S. Cl.
CPC ............ *G10L 15/197* (2013.01); *G10L 15/04* (2013.01); *G10L 15/22* (2013.01); *G10L 15/30* (2013.01);
(Continued)

(58) Field of Classification Search
CPC ......... G10L 15/00; G10L 15/04; G10L 15/16; G10L 15/22; G10L 15/30; G10L 15/197;
(Continued)

(56) References Cited

U.S. PATENT DOCUMENTS 4,817,156 A  3/1989  Bahl et al.
4,829,577 A  5/1989  Kuroda et al.
(Continued)

OTHER PUBLICATIONS

Zhang, Yaodong, and James R. Glass. "Unsupervised Spoken Keyword Spotting via Segmental DTW on Gaussian Posteriorgrams." Proceedings of the 2009 IEEE Workshop on Automatic Speech Recognition & Understanding (ASRU 2009) IEEE, 2009. 398-403. (Year: 2009).*

(Continued)

*Primary Examiner* — Daniel C Washburn
*Assistant Examiner* — Sean E Serraguard
(74) *Attorney, Agent, or Firm* — Foley & Lardner LLP

(57) ABSTRACT

Embodiments described herein provide for a computer that detects one or more keywords of interest using acoustic features, to detect or query commonalities across multiple fraud calls. Embodiments described herein may implement unsupervised keyword spotting (UKWS) or unsupervised word discovery (UWD) in order to identify commonalities across a set of calls, where both UKWS and UWD employ Gaussian Mixture Models (GMM) and one or more dynamic time-warping algorithms. A user may indicate a training exemplar or occurrence of call-specific information, referred to herein as "a named entity," such as a person's name, an account number, account balance, or order number. The computer may perform a redaction process that computationally nullifies the import of the named entity in the modeling processes described herein.

20 Claims, 9 Drawing Sheets

(51) Int. Cl.
    *G10L 15/30* (2013.01)
    *G10L 15/22* (2006.01)
    *G10L 15/08* (2006.01)
(52) U.S. Cl.
    CPC .. *G10L 2015/088* (2013.01); *G10L 2015/223* (2013.01)
(58) Field of Classification Search
    CPC ......... G10L 2015/088; G10L 2015/223; G10L 2015/0631; G06N 3/00; G06N 3/02; G06F 1/00; G06F 1/3203
    See application file for complete search history.

(56) References Cited

U.S. PATENT DOCUMENTS

| | | | |
|---|---|---|---|
| 4,972,485 A | 11/1990 | Dautrich et al. | |
| 5,072,452 A | 12/1991 | Brown et al. | |
| 5,475,792 A | 12/1995 | Stanford et al. | |
| 5,598,507 A | 1/1997 | Kimber et al. | |
| 5,659,662 A | 8/1997 | Wilcox et al. | |
| 5,835,890 A | 11/1998 | Matsui et al. | |
| 5,995,927 A | 11/1999 | Li | |
| 6,009,392 A | 12/1999 | Kanevsky et al. | |
| 6,055,498 A | 4/2000 | Neumeyer et al. | |
| 6,094,632 A | 7/2000 | Hattori | |
| 6,141,644 A | 10/2000 | Kuhn et al. | |
| 6,411,930 B1 | 6/2002 | Burges | |
| 6,463,413 B1 | 10/2002 | Applebaum et al. | |
| 6,519,561 B1 | 2/2003 | Farrell et al. | |
| 6,760,701 B2 | 7/2004 | Sharma et al. | |
| 6,882,972 B2 | 4/2005 | Kompe et al. | |
| 6,922,668 B1 | 7/2005 | Downey | |
| 7,003,460 B1 | 2/2006 | Bub et al. | |
| 7,209,881 B2 | 4/2007 | Yoshizawa et al. | |
| 7,318,032 B1 | 1/2008 | Chaudhari et al. | |
| 7,324,941 B2 | 1/2008 | Choi et al. | |
| 7,739,114 B1 | 6/2010 | Chen et al. | |
| 7,813,927 B2 | 10/2010 | Navratil et al. | |
| 8,160,877 B1 | 4/2012 | Nucci et al. | |
| 8,484,023 B2 | 7/2013 | Kanevsky et al. | |
| 8,484,024 B2 | 7/2013 | Kanevsky et al. | |
| 8,554,563 B2 | 10/2013 | Aronowitz | |
| 8,712,760 B2 | 4/2014 | Hsia et al. | |
| 8,886,663 B2 | 11/2014 | Gainsboro et al. | |
| 8,903,859 B2 | 12/2014 | Zeppenfeld et al. | |
| 9,042,867 B2 | 5/2015 | Gomar | |
| 9,336,781 B2 | 5/2016 | Scheffer et al. | |
| 9,343,067 B2 | 5/2016 | Ariyaeeinia et al. | |
| 9,355,646 B2 | 5/2016 | Oh et al. | |
| 9,373,330 B2 | 6/2016 | Cumani et al. | |
| 9,401,143 B2 | 7/2016 | Senior et al. | |
| 9,401,148 B2 | 7/2016 | Lei et al. | |
| 9,406,298 B2 | 8/2016 | Cumani et al. | |
| 9,431,016 B2 | 8/2016 | Aviles-Casco et al. | |
| 9,454,958 B2 | 9/2016 | Li et al. | |
| 9,460,722 B2 | 10/2016 | Sidi et al. | |
| 9,502,038 B2 | 11/2016 | Wang et al. | |
| 9,514,753 B2 | 12/2016 | Sharifi et al. | |
| 9,558,755 B1 | 1/2017 | Laroche et al. | |
| 9,584,946 B1 | 2/2017 | Lyren et al. | |
| 9,600,231 B1* | 3/2017 | Sun | G10L 15/02 |
| 9,620,145 B2 | 4/2017 | Bacchiani et al. | |
| 9,626,971 B2 | 4/2017 | Rodriguez et al. | |
| 9,633,652 B2 | 4/2017 | Kumiawati et al. | |
| 9,665,823 B2 | 5/2017 | Saon et al. | |
| 9,685,174 B2 | 6/2017 | Karam et al. | |
| 9,875,739 B2 | 1/2018 | Ziv et al. | |
| 9,875,742 B2 | 1/2018 | Gorodetski et al. | |
| 9,875,743 B2 | 1/2018 | Gorodetski et al. | |
| 9,881,617 B2 | 1/2018 | Sidi et al. | |
| 9,984,706 B2 | 5/2018 | Wein | |
| 10,141,009 B2 | 11/2018 | Khoury et al. | |
| 10,325,601 B2 | 6/2019 | Khoury et al. | |
| 10,872,339 B1* | 12/2020 | Kramme | G06Q 20/34 |
| 2002/0095287 A1 | 7/2002 | Botterweck | |
| 2002/0143539 A1 | 10/2002 | Botterweck | |
| 2003/0231775 A1 | 12/2003 | Wark | |
| 2003/0236663 A1 | 12/2003 | Dimitrova et al. | |
| 2004/0218751 A1 | 11/2004 | Colson et al. | |
| 2004/0230420 A1 | 11/2004 | Kadambe et al. | |
| 2005/0038655 A1 | 2/2005 | Mutel et al. | |
| 2005/0039056 A1 | 2/2005 | Bagga et al. | |
| 2005/0182629 A1* | 8/2005 | Coorman | G10L 13/07 704/266 |
| 2006/0111905 A1 | 5/2006 | Navratil et al. | |
| 2007/0198257 A1 | 8/2007 | Zhang et al. | |
| 2007/0294083 A1 | 12/2007 | Bellegarda et al. | |
| 2008/0195389 A1 | 8/2008 | Zhang et al. | |
| 2008/0312926 A1 | 12/2008 | Vair et al. | |
| 2010/0131273 A1 | 5/2010 | Aley-Raz et al. | |
| 2011/0010173 A1 | 1/2011 | Scott et al. | |
| 2012/0059656 A1* | 3/2012 | Garland | G10L 25/00 704/254 |
| 2012/0185418 A1 | 7/2012 | Capman et al. | |
| 2013/0041660 A1 | 2/2013 | Waite | |
| 2013/0080165 A1 | 3/2013 | Wang et al. | |
| 2013/0300939 A1 | 11/2013 | Chou et al. | |
| 2014/0046878 A1 | 2/2014 | Lecomte et al. | |
| 2014/0278412 A1 | 9/2014 | Scheffer et al. | |
| 2014/0337017 A1 | 11/2014 | Watanabe et al. | |
| 2015/0127336 A1 | 5/2015 | Lei et al. | |
| 2015/0161522 A1 | 6/2015 | Saon et al. | |
| 2015/0199960 A1 | 7/2015 | Huo et al. | |
| 2015/0269931 A1 | 9/2015 | Senior et al. | |
| 2015/0348571 A1 | 12/2015 | Koshinaka et al. | |
| 2016/0019883 A1 | 1/2016 | Aronowitz | |
| 2016/0078863 A1 | 3/2016 | Chung et al. | |
| 2016/0180838 A1 | 6/2016 | Parada San Martin et al. | |
| 2016/0240190 A1 | 8/2016 | Lee et al. | |
| 2016/0275953 A1 | 9/2016 | Sharifi et al. | |
| 2016/0284346 A1 | 9/2016 | Visser et al. | |
| 2016/0343373 A1 | 11/2016 | Ziv et al. | |
| 2017/0069313 A1 | 3/2017 | Aronowitz | |
| 2017/0098444 A1 | 4/2017 | Song | |
| 2017/0301341 A1* | 10/2017 | Tyagi | G10L 15/14 |
| 2017/0372725 A1 | 12/2017 | Khoury et al. | |
| 2018/0082689 A1 | 3/2018 | Khoury et al. | |
| 2018/0082691 A1 | 3/2018 | Khoury et al. | |
| 2019/0205786 A1* | 7/2019 | Shen | G06K 9/0055 |

OTHER PUBLICATIONS

Y. Zhang and J. R. Glass, "An inner-product lower-bound estimate for dynamic time warping," 2011 IEEE International Conference on Acoustics, Speech and Signal Processing (ICASSP), 2011, pp. 5660-5663 (Year: 2011).*

International Search Report issued in corresponding International Application No. PCT/US20/15310 dated May 1, 2020.

Rath et al., "Lower-Bounding of Dynamic Time Warping Distances for Multivariate Time Series." In: researchgate.net, Feb. 2003, [online] [retrieved on Apr. 5, 2020 (May 4, 2020)] Retrieved Bounding_of_Dynamic_Time_Warping_Distances_for_Multivariate_Time_Series., entire document, especially Abstract; p. 2.

Written Opinion of the International Searching Authority issued in corresponding International Application No. PCT/US20/15310 dated May 1, 2020.

Pigeon, Stéphane, Pascal Druyts, and Patrick Verlinde. "Applying logistic regression to the fusion of the NIST'99 1-speaker submissions." Digital Signal Processing 10.1-3 (2000): 237-248. (Year: 2000).

Novoselov, Sergey, Timur Pekhovsky, and Konstantin Simonchik. "SIC speaker recognition system for the NIST i-vector challenge." Odyssey: The Speaker and Language Recognition Workshop. 2014. (Year: 2014).

Gish, Herbert, M-H. Siu, and Robin Rohlicek. "Segregation of speakers for speech recognition and speaker identification." Acoustics, Speech, and Signal Processing, 1991. ICASSP-91., 1991 International Conference on. IEEE, 1991. (Year: 1991).

Xue, Jiachen, et al. "Fast query by example of environmental sounds via robust and efficient cluster-based indexing." Acoustics,

(56) References Cited

OTHER PUBLICATIONS

Speech and Signal Processing, 2008. ICASSP 2008. IEEE International Conference on. IEEE, 2008. (Year: 2008).
El-Khoury, Elie, Christine Senac, and Julien Pinquier. "Improved speaker diarization system for meetings." Acoustics, Speech and Signal Processing, 2009. ICASSP 2009 IEEE International Conference on. IEEE, 2009 (Year 2009).
Dehak, Najim, et al. "Front-end factor analysis for speaker verification." IEEE Transactions on Audio, Speech, and Language Processing 19.4 (2011): 788-798. (Year: 2011).
Prazak, Jan, and Jan Silovsky. "Speaker diarization using PLDA-based speaker clustering." Intelligent Data Acquisition and Advanced Computing Systems (IDAACS), 2011 IEEE 6th International Conference on. vol. 1. IEEE, 2011. (Year: 2011).
Rouvier, Mickael, et al. "An open-source state-of-the-art toolbox for broadcast news diarization." Interspeech. 2013. (Year: 2013).
Meignier, Sylvain, and Teva Merlin. "LIUM SpkDiarization: an open source toolkit for diarization." CMU SPUD Workshop. 2010. Year: 2010).
Luque, Jordi, Carlos Segura, and Javier Hernando. "Clustering initialization based on spatial information for speaker diarization of meetings." Ninth Annual Conference of the International Speech Communication Association. 2008. (Year: 2008).
Atrey, Pradeep K., Namunu C. Maddage, and Mohan S. Kankanhalli. "Audio based event detection for multimedia surveillance." Acoustics, Speech and Signal Processing, 2006. ICASSP 2006 Proceedings. 2006 IEEE International Conference on. vol. 5. IEEE, 2006. (Year: 2006).
Shajeesh, K. U., et al. "Speech enhancement based on Savitzky-Golay smoothing filter." International Journal of Computer Applications 57.21 (2012). (Year: 2012).
Shum, Stephen, et al. "Exploiting intra-conversation variability for speaker diarization." Twelfth Annual Conference of the International Speech Communication Association. 2011. (Year: 2011).
Gencoglu Oguzhan et al: "Recognition of Accoustic Events Using Deep Neural Networks", 2014 22nd European Signal Processing Conference (ELISIPCO), EURASIP, Sep. 1, 2014 (Sep. 1, 2014), pp. 506-510, XP032681786.
International Search Report (PCT/ISA/210) issued in the corresponding International Application No. PCT/US2017/039697, dated Sep. 20, 2017.
Written Opinion of the International Searching Authority (PCT/ISA/237) issued in the corresponding International Application No. PCT/U52017/039697, dated Sep. 20, 2017.
Baraniuk, R.G., "Compressive Sensing [Lecture Notes]", IEEE Signal Processing Magazine, vol. 24, Jul. 2007, pp. 1-9.
Cumani, S., et al., "Factorized Sub-space Estimation for Fast and Memory Effective i-Vector Extraction", IEEE/ACM TASLP, vol. 22 Issue 1, Jan. 2014, pp. 248-259.
Gao, J. et al., "Dimensionality Reduction via Compressive Sensing", Pattern Recognition Letters 33, Elsevier Science BV 0167-8655, 2012.
Ghahabi OMID et al., "Restricted Boltzmann Machine Supervectors for Speaker Recognition," 2015 IEEE International Conference on Acoustics, Speech and Signal Processing (ICASSP), IEEE, Apr. 19, 2015. pp. 4804-4808, XP033187673.

Kenny P. "A Small Footprint i-Vector Extractor" Proc. Odyssey Speaker and Language Recognition Workshop, Singapore, Jun. 25, 2012.
Lei et al., "A Novel Scheme for Speaker Recognition Using a Phonetically-aware Deep Neural Network", Proceedings an ICASSP. Florence, Italy:IEEE Press, 2014:1695-1699.
Szu-Wei Fu et al., "SNR-Aware Convolutional Neural Network Modeling for Speech Enhancement", Interspeech 2016, vol. 2016, Sep. 8, 2016, pp. 3768-3772, XP055427533.
Xu, L., et al. "Rapid Computation of i-Vector" Odyssey, Bilbao, Spain, Jun. 21-34, 2016.
Garcia-Romero et al., "Unsupervised Domain Adaptation for i-vector Speaker Recognition," Odyssey 2014, pp. 260-264.
Khoury et al., "Combining transcription-based and acoustic-based speaker identifications for broadcast news," ICASSP, K yoto, Japan, 2012, pp. 4377-4380.
Khoury et al., "Hierarchical speaker clustering methods for the NIST i-vector challenge," Odyssey 2014, pp. 254-259.
Schmidt, et al., "Large-scale speaker identification," ICASSP, 2014, pp. 1650-1654.
Anguera, et al. "Partial sequence matching using an Unbounded Dynamic Time Warping algorithm." IEEE ICASSP, Apr. 2010, pp. 3582-3585.
International Search Report and Written Opinion in corresponding PCT Application PCT/US2017/052335, dated Dec. 2017, 10 pages.
Scheffer et al., "Content matching for short duration speaker recognition", INTERSPEECH, Sep. 14-18, 2014, pp. 1317-1321.
Sturim et al., "Speaker Linking and Applications Using Non-Parametric Hashing Methods," Interspeech, Sep. 2016, 5 pages.
Prince, S., et al., "Probabilistic, Linear Discriminant Analysis for Inferences about Identity," Proceedings of the International Conference on Computer Vision, Oct. 14-21, 2007.
Richardson, F. et al., "Speaker Recognition Using Real vs Synthetic Parallel Data for DNN Channel Compensation", INTERSPEECH, 2016.
Richardson, F., et al., "Deep Neural Network Approaches to Speaker and Language Recognition", IEEE Signal Processing Letters, vol. 22, No. 10, Oct. 2015, pp. 1671-1675.
Richardson, F., et al., "Channel Compensation for Speaker Recognition using MAP Adapted PLDA and Denoising DNNs", Proc. Speaker Lang. Recognit. Workshop, Jun. 22, 2016, pp. 225-230.
Solomonoff, A., et al. "Nuisance Attribute Projection", Speech Communication, Elsevier Science BV, Amsterdam, The Netherlands. May 1, 2007.
Zhang et al. "Extracting Deep Neural Network Bottleneck Features using Low-rank Matrix Factorization", IEEE ICASSP, 2014.
W.Q. Zheng et al., An experimental study of speech emotion recognition based on deep convolutional neural networks; 2015 International Conference on Affective Computing & Intelligent Interaction (ACII); pp. 827-831. (Year 2015).
Yaodong Zhang et al., "Unsupervised Spoken Keyword Spotting via Segmental DTW on Gaussian Posteriorgrams." Proceedings of the 2009 IEEE Workshop on Automatic Speech Recognition & Understanding (ASRU 2009) IEEE, 398-403. (c) 2009 IEEE.
Yaodong Zhang et al., "An Innter-Product Lower-Bound Estimate for Dynamic Time Warping," MIT Computer Science and Artificial Intelligence Laboratory, 978-1-4577-0539-7/11, ICASSP 2011.
International Preliminary Report on Patentability for PCT/US2020/015310 dated Aug. 12, 2021 (8 pages).

\* cited by examiner

UNSUPERVISED KEYWORD SPOTTING AND WORD DISCOVERY FOR FRAUD ANALYTICS

CROSS-REFERENCE TO RELATED APPLICATIONS

This application claims priority to U.S. Provisional Application No. 62/797,814, filed Jan. 28, 2019, which is hereby incorporated by reference in its entirety.

This application is related to U.S. Pat. No. 10,141,009, entitled "System And Method For Cluster-Based Audio Event Detection," filed May, 31, 2017, and U.S. Pat. No. 10,325,601, entitled "Speaker Recognition In The Call Center," filed Sep. 19, 2017, which are hereby incorporated herein in their entirety.

TECHNICAL FIELD

This application generally relates to systems and methods of intelligent automated fraud detection in audio signals, and computationally modeling fraud behaviors across signals having embedded unique content.

BACKGROUND

Fraudsters often employ techniques repetitively when attempting to defraud organizations over the phone, often by calling a call center to gather private information or effectuate some bad act through social engineering techniques. These fraud techniques include behavioral or spoken scripts that impart common phrases, but also involve same or similar spoken caller identification (e.g., name, account number) and same or similar metadata about the call (e.g., carrier information, device information). In addition, customer service representatives (CSRs) are trained to engage with callers with a prescribed script related to the issues raised by a caller. It would be desirable for fraud detection and analysis purposes for anti-fraud tools that automatically identify commonalities in the exchanges between callers and call center personnel (e.g., CSRs) to pattern fraudster behaviors. In particular, it would be desirable for fraud analysis tools to automate processes of identifying commonalities in past calls for both building a knowledgebase of fraudulent behaviors and detecting fraudulent calls.

There have been fraud analysis tools that focus on detecting what is said by fraudsters during phone calls made to contact centers. The audio of the calls usually transcribed and analyzed by contact center personnel or other fraud analysts to identify and detect fraudulent behavior as well as patterns. But transcribing audio calls employ tools and processes that can be resource demanding or otherwise limiting; namely, acoustic models that generalize to the channel conditions in the contact center, language models that are specifically trained to phone conversations within financial institutions, and the real-time nature of transcription tools. Even with state-of-the-art transcription services, doubts remain about the word error rate, and it is uncertain whether an analyst must transcribe an entire conversation at all. Therefore, what is needed are fraud detection and analysis tools that can automatically detect commonalities across numerous disparate fraud calls using their spoken speech signals, without the need for a transcription to model the features of the fraud calls.

For example, some automated speech recognition (ASR) engines can be configured to operate without the need for a transcription. But current ASR tools do not work well for unsupervised recognition of spoken content for past recordings, because extant ASR tools require a language model configured using transcriptions that highly very relevant to a particular call center. The ASR would therefore be less effective in its capabilities, as mentioned above, and it would be less flexible in its deployment, because a language model would have to be developed for, e.g., retail banking and insurance. So what is needed is a fraud detection tool that does not require language model to detect keywords, and that only requires models based on the acoustics of calls.

In addition, because the fraudster calls follows a script, fraud analysts could review calls or call transcripts to identify commonalties to identify patterns. But even if this review effort could be automated by conventional means to identify the same keywords or phrases in numerous fraudulent calls, the automated tool would still be limited in its applicability, because existing technologies cannot account for call-specific content. Fraudsters using the same keywords or key phrases in their script might provide the call center with specific information, such as a name, account number, order number, address, or other information specific to that particular call or calls. But the fraudster may change the call-specific information the fraudster provides across the volume of their fraudulent calls. So given hundreds, thousands, or millions of calls, there may be meaningful patterns or an identifiable script, even though there may be variations in call-specific information. Conventional speech-based detection tools cannot control for these variations. Therefore, what is needed is, not only a fraud detection tool for detecting commonalities across fraud calls without the need for a transcription to model the features of the fraud calls, but also a fraud detection tool that can detect commonalities in numerous fraud calls despite the calls having embedded call-specific information.

SUMMARY

Disclosed herein are systems and methods capable of addressing the above-described shortcomings and may also provide any number of additional or alternative benefits and advantages. Embodiments described herein provide for a computer that detects one or more keywords of interest using acoustic features, to detect or query commonalities across multiple fraud calls. Embodiments described herein may implement unsupervised keyword spotting (UKWS) or unsupervised word discovery (UWD) in order to identify commonalities across a set of calls, where both UKWS and UWD employ Gaussian Mixture Models (GMM) and one or more dynamic time-warping algorithms. A user may indicate a training exemplar or occurrence of call-specific information, referred to herein as "a named entity," such as a person's name, an account number, account balance, or order number. The computer may perform a redaction process that computationally nullifies the import of the named entity in the modeling processes described herein.

In an embodiment, a computer-implemented method comprises generating, by a computer, a plurality of audio frames from a plurality of audio signals; clustering, by the computer, one or more features of each audio frame according to a modeling algorithm, thereby generating one or more models for each frame; extracting, by the computer, posterior probabilities for each of the one or more features of extracted from the audio frames according to the one or more models; receiving, by the computer, from a client computer a keyword indicator for a keyword to query in the audio signals, the keyword comprising one or more words; receiving, by the computer, from the client computer a named entity indicator for a named entity to be redacted from the query, wherein the computer nullifies the posterior probability of each frame containing the named entity; calculating, by the computer, for each audio frame containing the keyword, a first similarity score and a second similarity score, the first similarity score and the second similarity score of an audio frame calculated using a model selected for the respective frame based on the posterior probability of the audio frame; storing, by the computer, into a queue, a subset of audio frames having a second similarity score comparatively higher than a corresponding first similarity score, the subset containing a review-threshold amount of audio frames; and generating, by the computer, a list of audio segments of the audio signals matching the keyword, the list of audio segments containing at least one of the audio frames in the subset.

In another embodiment, a computer-implemented method comprises segmenting, by a computer, a first audio signal into a first set of one or more audio segments, and a second audio signal into a second set of one or more audio segments; generating, by the computer, sets of one or more audio paths for each audio segment in the first set of audio segments, and sets of one or more paths for each audio segment in the second set of audio segments; calculating, by the computer, based on lower-bound dynamic time-warping algorithm, a similarity score for each path of each audio segment of the first set of audio segments, and for each path of each audio segment of the second set of audio segments; and identifying, by the computer, at least one similar acoustic region between the first set of segments and the second set of audio segments, based upon comparing the similarity scores of each path of each segment of the first set of audio segments against the similarity scores of each path of each segment of the second set of audio segments.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
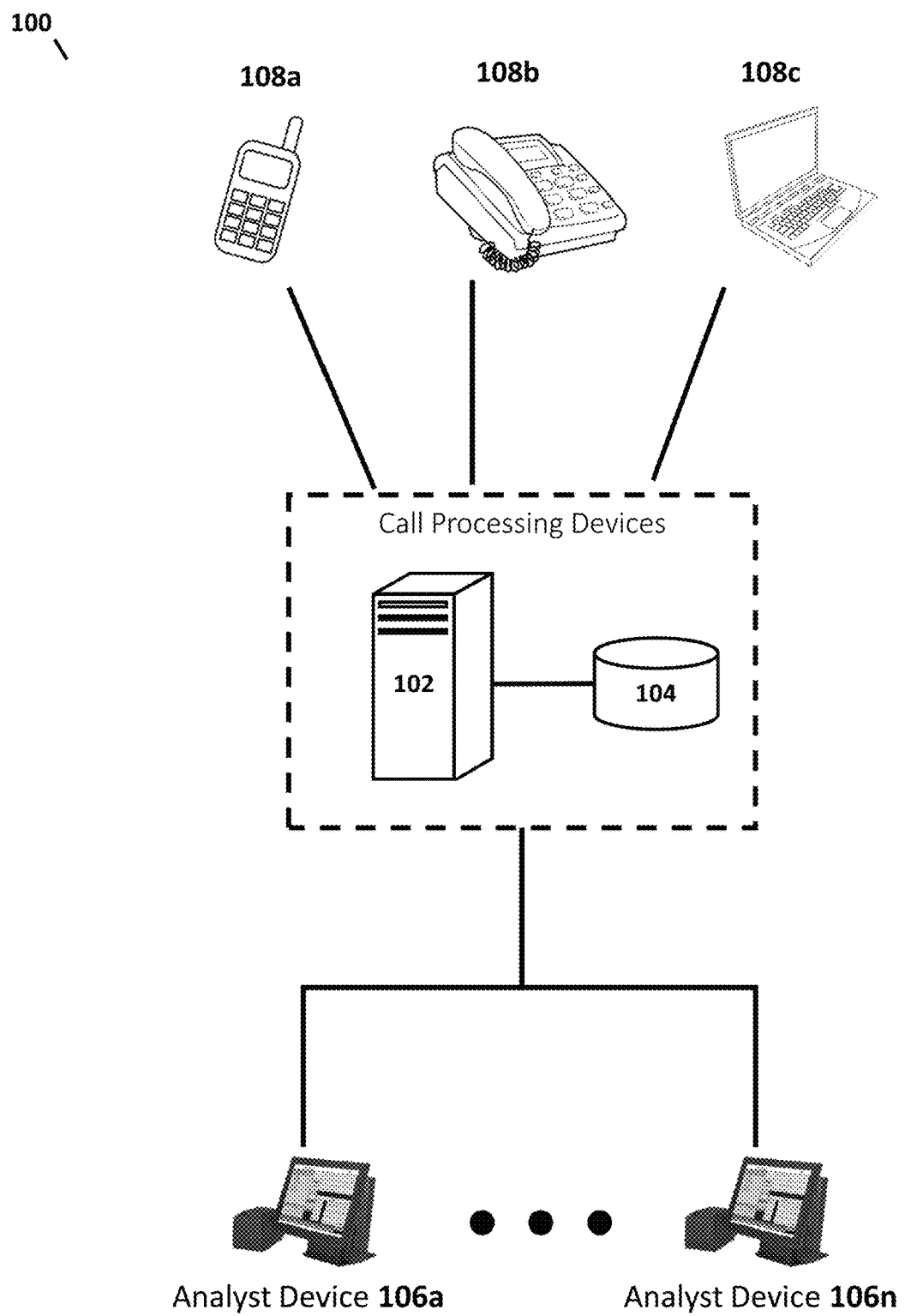
FIG. 1 shows components of a system for call analysis, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

It would be beneficial for patterning fraudster behaviors if common speech content across multiple calls could be modeled and analyzed, but in a way that controls for or otherwise identifies call-specific content—referred to herein as "named entities" (e.g., names, account numbers, birthdays, locations). Service center calls often have the same or similar spoken exchanges between customer service representatives (CSRs) and callers, because a CSR may have a prescribed script the CSR must follow. The result is that a service center will hear multiple callers speak, for example, their name. Likewise, fraudsters will often follow a script of their own, developed through social engineering techniques and trial-and-error. As a result, a fraudster will employ the same spoken script over multiple calls, but change some of the specific information provided to each of the CSRs over the phone. In any case, existing ASR engines will have trouble detecting common fraudster scripts because conventional software cannot generate adequate models that control for named entities. The embodiments described herein provide for computer-executed unsupervised keyword spotting and word discovery processes that address these issues. It should be appreciated that, as used herein, the terms "phrase" and "keyword" refer to some collection of one or more words, and may be used herein interchangeably unless otherwise noted.

ASR engines typically employ a universal background model (UBMs) generated with a Gaussian Mixture Model (GMM). These UBM/GMM models ordinarily use a distribution of the training data that approximates the distribution of all anticipated test data. Successful learning techniques of the UBM include the use of an expectation-maximization (EM) algorithm, which aims to compute the parameters of the model such that the likelihood of those parameters is maximized over the training data. In the context of speaker recognition, GMM clustering may use an EM algorithm. The UBM/GMM may be used to cluster features in audio frames of training and/or test audio segments and also extract posterior probabilities or posteriorgrams for the audio frames. As used herein, an "audio frame" may be a window of an audio signal having a duration of time, e.g., 10 milliseconds (ms). In one or more embodiments, a feature vector may be extracted from an audio frame. A "segment" is a collection of contiguous audio frames. A "cluster" is considered to be a group of audio frames according to one or more algorithms, and where such audio frames in a cluster need not be contiguous. Depending on context, an audio frame may be represented by features based on the audio frame. Thus, forming clusters of audio frames of an audio signal may be done by forming clusters of features based on audio frames. One skilled in the art would recognize that a posterior probability vector is a representation of the linguistic content of an utterance in speech segments. Likewise, a person skilled in the art would recognize that a Gaussian posteriorgram is a posterior probability vector representing the posterior probabilities of a set of Gaussian components for features in a speech frame. It should be appreciated that for the purposes of this disclosure, the terms "posterior probability vector," "posterior probability vector," and "Gaussian posteriorgram" may be used interchangeably.

Keyword spotting (KWS) is a branch of automatic speech recognition (ASR) where a user, such as a fraud analyst, submits a text query into a database to search for acoustic events containing the queried content (e.g., words, call event, speaker) of interest. Conventional supervised KWS systems typically employ both acoustic models and language models. Acoustic models can be trained at the phoneme-level for perceptually distinct units of sound, and are typically modeled using a Hidden Markov Model (HMM). A language model is obtained from a large corpus of speaker phrases (e.g., sentences, words), where the corpus is exhaustive enough that the language model can generalize particular phrases, then it can be used detect phrases of interest specific to a domain where the language model will be applied. This corresponds to having a large vocabulary continuous speech recognition (LVCSR) system that can decode speech to text and then employ a text-based query using a queried keyword. Language models typically have a direct impact on system performance (e.g., efficiency, quality, computing resource demand). And supervised KWS require some form of supervised input to annotate or label the data set used to train the acoustic model. Conventional supervised KWS approaches can be inefficient, resource-intensive, under-inclusive, and inaccurate.

Unsupervised keyword spotting (UKWS) can be employed in certain circumstances (e.g., low-resource languages, domain-specific purposes), or in order to lessen the demands on organizational resources (e.g., personnel, computing resources), because UKWS disregards the use of language models. Rather, UKWS relies solely on the acoustic characteristics of the audio signals and using retrieval search-query algorithms to identify matches with a user's entered search query. In UKWS, there is no language model involved and there is no need for labelled acoustic data. The model for UKWS trained directly on the audio speech data itself, in an unsupervised manner that does not require labelled data sets or a language model. A user inputs or otherwise selects an example of a keyword or key phrase, via a GUI, to the executing computer, which the computer then outputs a list of occurrences of that keyword or key phrase identified in a database. The computer may transmit the list to the user device (e.g., analyst device) for display to the user via the GUI.

Another branch of content-based information retrieval is unsupervised word discovery (UWD), which is entirely unsupervised in nature. Like UKWS, UWD does not rely on analyzing transcriptions of audio to build a language model. But unlike UKWS, UWD does not require a user to input samples, queries, or other parameters (e.g., threshold values). Discovering word (or phrases having one or more words) relies upon clustering phrases that are repeatedly spoken in one or more audio signals, but without relying on a user-provided example segments of a keyword for retrieval.

A computer, such as a fraud analyst computer or a centralized analysis server, may execute an keyword spotting software module for performing various processes and tasks described herein. In unsupervised keyword spotting, a computer receives one or more audio files containing speech segments with instances of some keyword, where the segments may include any number of "example keyword segments," "query segments," and "test segments" for training, fine-tuning, and querying models. The computer parses the segments into frames, and the features of those frames are extracted from the segments. The computer trains a Gaussian mixture model (GMM) that can be employed to cluster the features of speech frames (of the segments) and extract a posterior probability for the segments or frames.

When the GMM is trained, a user can input keyword indicators, via a GUI, indicating where a desired keyword occurs in one or more segments, selectable by the user. The computer may apply the GMM against the keyword segment, and any number of additional segments, to extract the posterior probabilities for the frame-level features of the keyword segment and the additional segments. After the computer has extracted the posterior probabilities, or posteriorgrams, for the segments, the computer executes a lower-bound dynamic time-warping (LB-DTW) algorithm on the posterior probabilities to identify occurrences of the input keyword in the collection segments. The computer then calculates a segmental dynamic time warping (SDTW) algorithm for segments having an LB-DTW score that satisfies a threshold or for some number of segments having an LB-DTW score with the comparatively best scores (e.g., highest, lowest). The computer then stores a subset of segments into a results queue each segment having an LB-DTW score that is less than the segment's SDTW. These audio segments are more likely to include the input keyword indicated by the user.

For example, a query keyword received may be received from a user or may otherwise be predetermined (e.g., stored search query). The computer may identify matches using, for example, k-nearest neighbor (kNN) algorithm, where k is some predetermined threshold from a user or otherwise hard-coded. The computer may identify the k-best matching test utterances (e.g., segments, frames) in a data set of test segments containing the keyword. The computer may perform the matching using a SDTW algorithm, or other DTW algorithm, on each segment or frame. In some implementations, when comparing a query keyword (e.g., segments, frames) with a test utterance (e.g., segments frames), the computer may use a sliding window with a size equal to a length of the keyword and to the test utterance (e.g., segments, frames) to minimize the size of a DTW search region. The sliding window may be moved, for example, one frame forward for a given interval, from the beginning frame of the test utterance to the end frame. The computer may perform a series of DTW-based matches to locate a best-matching segment containing the keyword query. As mentioned, a score for a test segment or frame containing all or a portion of a query keyword segment or frame is likely the smallest score obtained for that test segment or frame.

Some embodiments described herein may post-process abstracted frame-level features or Gaussian posteriorgrams in order to "redact" a named entity from the various modeling and analysis processes. The computer may receive redaction instructions from the user containing a named entity. In order to identify a match between two segments that, but for an embedded named entity, would otherwise match, the computer must process the segments in a way that is computationally agnostic to frames containing the named entity. To that end, the computer assigns an equal posterior probability to all Gaussian mixtures at the frames occurring in a region within an input keyword segment containing the named entity. This statistically smooths the frames having the named entity, thereby computationally nullifying the impact these frames have on process steps such as modeling, extractions, and query results. The computer, however, retains information regarding the frames before and after the named entity, which are still pertinent to the various process steps. Consequently, the computer may rely on the ability to detect inputted keywords of interest using the frame-level acoustic features, even when those inputted keywords contain embedded disparate named entities.

As an example of a unsupervised keyword spotting implementation, a user (e.g., a fraud analyst) enters or selects an example of a keyword having one or more words via graphical user interface (GUI) on the user or client device (e.g., analyst computer, client computer), which instructs the user device to transmit the user-selected example of the keyword to the server. The user may come across a fraud call, either when conducting some post-call analysis or by personally participating in the fraud call, and note that a requested transaction amount was seemingly excessive. The user may select a segment of that fraudster's speech in the GUI and instruct an analysis server to search for that particular speech segment in other fraud calls to see if a similar attack had taken place.

Additionally or alternatively, a computer, such as a fraud analyst computer or a centralized analysis center, may execute an unsupervised word discovery (UWD) software module for performing various processes and tasks described herein. In UWD, the computer executes an SDTW algorithm in a manner similar to the UKWS described above. The computer automatically detects instances of a keyword (having one or more words) without any user provided inputs. In the word discovery implementations, a user (e.g., fraud analyst) is taken out of the process and the entire process is automated. In operation, every call in database is compared against each other call to find instances of keywords that are similar to each other, without a user-provided example, by building a graph of segments that sound very similar to each other in terms of the content, according to one or more dynamic time-warping algorithms and contextual models, and automatically identifies instances of that keyword.

Components of Exemplary System

FIG. 1 shows components of a system 100 for call analysis, according to an exemplary embodiment. The exemplary system 100 may comprise call processing devices, including an analysis server 102 and a database 104, which may be computing devices that receive, parse, process, and store call audio and call-related data. The system 100 may further comprise analyst devices 106 and caller devices 108. The server 102, database 104, and analyst devices 106 may be connected with each other via hardware and software components of one or more networks. Examples of a network include, but are not limited to, Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

It should be appreciated that FIG. 1 is merely one example of the devices of a system 100. Although FIG. 1 only shows an exemplary system 100 embodiment having only a few of the various components, it should be appreciated that embodiments may comprise, be coupled to (via one or more networks), or otherwise implement any number of devices capable of performing the various features and tasks described herein. For example, some embodiments may comprise multiple servers 102. As another example, some embodiments may incorporate a database 104 into a server 102, such that these features are integrated within a single device. In a similar example, some embodiments may incorporate an analyst device 106 into a server 102, such that a single computing device performs the features and tasks of such devices. One having skill in the art will appreciate that other embodiments may comprise additional or alternative devices, or may omit devices shown in FIG. 1, and that such alternative embodiments still fall within the scope of this disclosure.

Call analysis devices may be computing devices that receive incoming call audio and call-related data. The call analysis devices may analyze the call audio and related data for various purposes and store the results of such analysis. Analysts may review and query this data to identify trends or patterns in, for example, fraudulent activity. In some implementations, analysts may access this data from an analyst device 106 using a web-based user interface (e.g., browser) that communicates with a webserver application hosted on a server 102, or the analysts device may have a native, locally installed application that accesses a server 102.

Call analysis devices may include one or more analysis servers 102. An analysis server 102 may be any computing device comprising memory, a processor, and software that are configured for various features and tasks described herein. Non-limiting examples a server 102 may include a server computer, laptop computer, desktop computer, and the like. A server 102 may be located in between the caller's device 108 and a call destination, such as a call center in FIG. 1. The server 102 may receive call audio call-related data associated with phone calls directed to the call center. In some cases, the server 102 may receive and convert a call signal of a phone call into call data having a computer-readable format of the call signal, and store such call audio into a database 104. In some cases, phone calls may have been converted and stored into the database 104 beforehand. In any case, the server 102 may, automatically or in response to an instruction from an analyst device 106, query and retrieve one or more call audio files comprising the call audio of any number of phone call signals. The server 102 may likewise update call audio data or store new data into the database 104, according to the server 102 operations. For instance, in some implementations, the server 102 will parse a call signal into multiple segments, which the server 102 can then store into the database 104. Additionally or alternatively, the server may keep one or more segments or other data in volatile memory during server 102 operations. In some embodiments, the server 102 may execute a voice-activated detection module configured to detect utterances in speech signals, and in some cases, may generate one or more segments of speech signals.

Call analysis devices may further include one or more databases 104 that store, query, and update data associated with phone calls directed to the call center. A database 104 may comprise non-volatile memory, a processor, and software (e.g., database management software) configured for the various features and tasks described herein. In some embodiments, a database 104 may be hosted on a separate device from a server 102; and in some embodiments, a database 104 may be hosted on a server 102. A database 104 may store computer-readable files containing call audio signals of phone calls, as well as call-related data (e.g., metadata), user-related data, and analysis-related data. The data stored in the database 104 is accessible by the analysis server 102 and analyst devices 106 for conducting fraud detection, fraud pattern recognition, data analysis, and other forms of information retrieval. The server 102 also accesses the database 104 to execute and update, or "train," the various machine-learning and artificial intelligence algorithms that are executed by the server 102.

In some implementations, the database 104 may store fraud calls for call centers or other types of organizations. The database may retrieve a set of fraud calls for a call center in response to a request from an analyst device 106 associated with and authorized to retrieve data for the call center. The set of fraud calls may be used as an initial of fraud calls the user is interested analyzing. The user may then select, via a GUI, the keywords of interest. In response, the database 104 stores the selected keywords and the features (e.g., MFCCs) of those keywords into the database for later comparison purposes.

In some implementations, a database 104 may store analysis-related data for prior or ongoing fraud analyses processes. The analysis-related data may include, for example, keywords inputted for searches, named entities for redaction, timestamps, audio segments, audio frames, GMMs, and extracted posterior probabilities.

Analyst devices 106 is used by users (e.g. fraud analysts) for fraud detection and analysis efforts, by providing instructions to an analysis server 102 and accessing (e.g., querying) a database 104. An analyst device 106 may be any computing device comprising memory, a processor, and software that are configured for various features and tasks described herein. Non-limiting examples an analyst device 106 may include a server computer, laptop computer, desktop computer, a tablet computer, and the like. Analyst devices 106 are coupled via one or more networks to analysis server 102 and a database 104, allowing an analyst device 106 to communicate instructions (e.g., database queries, modeling instructions) to the analysis server 102 related to various fraud analysis efforts, including various tasks and processes described herein.

It should be appreciated that the functions and features are described in embodiments herein as being executed by the analyst device 106 may, in other embodiments, have other devices, such as an analysis server 102, execute certain functions and features. In some embodiments, for example, the analysis server 102 and the analyst device 106 may be the same computing device. Moreover, this disclosure describes embodiments implementing a cloud-based environment that organize the analysts devices 106 and analysis server 102 in a client-server arrangement, where the analysis server 102 executes the various fraud detection processes. But other embodiments may have the analyst device 106 perform the various fraud detection and analysis tasks and processes. In such embodiments, the analysis server 102 is configured to receive instructions for, and distribute data-outputs related to, administrative or collaborative features, such as sharing outputs, data sets, and results with other organizations.

An analyst device 106 may have locally stored native software associated with the system 100 that communicated with the analysis server 102; or the analyst device 106 may interact with the analysis server 102 via a browser-based web-portal. The analyst device 106 may present a user with a graphical user interface (GUI) (sometimes referred to herein as a "call workspace") allowing the user to interact with the analysis server 102. The GUI may be configured to display various execution options for providing instructions and parameters to the analysis server 102, as well as the various inputs and outputs transmitted to and received from the analysis server 102. In some cases, selectable options are based on data stored in the database 104, which is accessible by and transmitted to the analyst device 106 according to credentials or other identifying information associating the user or the user's organization with the relevant data records in the database 104. For example, call-related data for prior calls to the user's call center may be displayed on the GUI. This may allow the user to select a prior call of interest from a list of prior calls. The user may then select segments or regions of that prior call in order to trigger fraud detection processes and to indicate process-related parameters, such as a timestamps encompassing inputted keyword or phrase of interest.

As another example, after a detection process has completed, the analysis server 102 may send the outputs to analyst device 106 for display via the GUI. The user may select from a menu related to a query, such as a drop down menu, allowing the user to filter how many segments he or she wants to review. Other parameters may be used to filter a list or otherwise display information to the user. Non-limiting examples may include metadata factors such as carrier, country, phone number, device data, and the like. In some implementations, the GUI may also present the time index when exactly the keyword or phrase of interest occurred in an identified segment of a call.

Caller devices 108 may be any device that callers can use to place a call to a destination employing various processes and tasks described herein. Non-limiting examples of caller devices may include mobile phones 108a or landline phones 108b. Caller devices 108 are not limited to telecommunications-oriented devices (e.g., telephones), but may also include devices and software implementing VoIP protocols for telecommunications, such as computers 108c.

Exemplary Processes for Keyword Spotting

Figure 2:
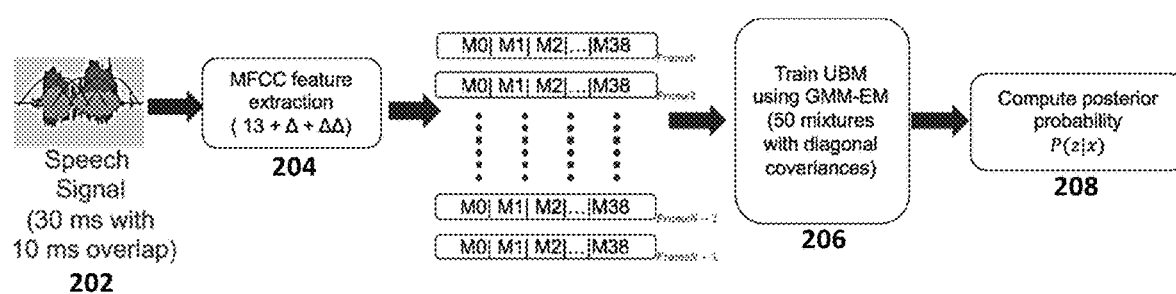
FIG. 2 is a flowchart showing execution steps for an operational pipeline of feature extraction, training, and posterior probability computation using a set of audio files, according to an exemplary process.

FIG. 2 is a flowchart showing an operational pipeline of feature extraction, training, and posterior probability computation using a set of audio files, according to an exemplary process 200 executed by an analysis server. Although the steps of the exemplary process 200 may be performed by multiple computing devices, the following details a single computer implementing the steps. It should also be understood that the steps shown and described herein are merely illustrative and additional, alternative, and fewer number of steps should be considered to be within the scope of this disclosure.

Audio files may comprise computer-readable data containing audio speech signals captured and stored during or after phones calls associated with callers. In some cases, an audio file may be stored or retrieved from a server or database. And in some cases, an audio file may be incoming data stream for an ongoing call, where the analysis server decodes the call audio to covert or otherwise process the call signal of the ongoing call in real-time or near real-time. In the exemplary process 200, the audio files may be transmitted to or received by the analysis server in order to train, test, and/or implement (e.g., execute a query) the models used by the analysis server.

In a first step 202, from a set of audio files containing speech signals, the computer may parse an audio speech signal into any number of segments and frames. A frame contains some portion of a segment and has a fixed-length or duration, forming a fixed-length portion of the segment. A speech segment is a collection of one or more audio frames and may have a fixed or variable length, depending on an algorithm used to detect regions containing human speech. As an example, a segment may contain "I would like to know the balance in the account," and each frame of the segment comprises some portion of the segment.

In some implementations, the server may implement a detection process on the audio signal, which may be a computer-executed software routine configured to detect regions of the audio signal containing voice input from a caller. In such implementations, the output of the detection process generates the audio segments for the ongoing process 200. Additionally or alternatively, in some implementations, a user (e.g., fraud analyst) may select parameters defining characteristics of the segments (e.g., number of segments, length of segments). The user can input these parameter selections into a GUI, and the user device then transmits corresponding instructions and indicators to the analysis server.

In a next step 204, for each audio frame, the server extracts one or more features, such as Mel-Frequency Cepstral Coefficients (MFCCs). In some implementations, the user may select extraction parameters (e.g., number of features), which the user can input into the GUI to instruct the analysis server extract the features according to the extraction parameters.

In a next step 206, the server clusters the extracted features using one or more algorithms in order to train a universal background model (UBM) using Gaussian Mixture Models (GMM). The server may cluster the frame-level features using an expectation-maximization algorithm (EM) for training the UBM/GMM. As shown in FIG. 2, the server may extract thirty-nine (39) features (M0 . . . M38) from each frame. To train the UBM, the server then clusters the frame-level features (M) using a GMM with, for example, 50 mixtures and diagonal covariance matrices.

In a next step 208, the server extracts corresponding posterior probabilities or posteriorgrams using the UBM/GMM for each of the frame features.

As an example of FIG. 2, the server may receive or retrieve a given set of audio files from a client computer or a database, according to instructions received from a user. For each audio file, the server segments the audio signal into segments, and parses the segments into frames according to a 30 ms Hamming window with a shift of 10 ms. For each frame, the server extracts thirty-nine (39) MFCCs from the frame. Using a Gaussian mixture model (GMM) with 50 mixtures and diagonal covariance matrices, the server clusters the frame features (MFCCs), and then extracts a corresponding posterior probabilities or posteriorgrams for each feature using the GMM model.

Figure 3:
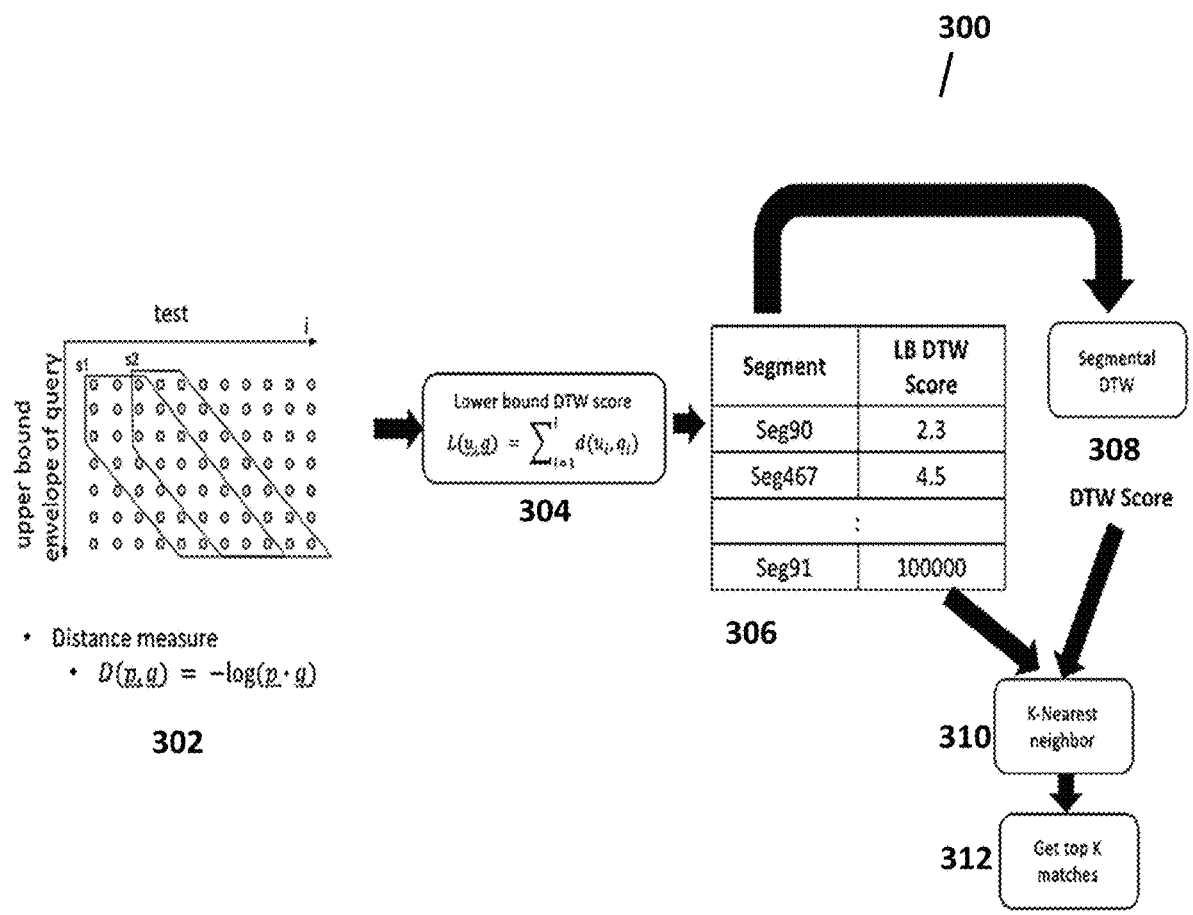
FIG. 3 is a flowchart showing execution steps of an exemplary process for segmental dynamic time warping (SDTW) of query and test utterances or speech signals.

FIG. 3 is a flowchart showing execution steps of an exemplary process 300 for segmental dynamic time warping (SDTW) of query and test utterances or speech signals, with a k-nearest neighbors (kNN) algorithm employed to get top K matches using lower-bound dynamic time-warping score (LB-DTW) and SDTW scores. Although the steps of exemplary process 300 may be performed by multiple computing devices, the following details a single computer implementing the steps. It should also be understood that the steps shown and described herein are merely illustrative and additional, alternative, and fewer number of steps should be considered to be within the scope of this disclosure.

After extracting the posterior probabilities, as in the above exemplary process 200, a user may then select, via the GUI, a keyword (e.g. one or more words) of interest to be searched for in the user interface (UI). The inputted keyword selection may indicate one or more timestamps (e.g., onset and offset times) of occurrences of the selected keyword. The user may then select, in the GUI, a region within the selected keyword, that contains a named entity. The server receives an indicator for the named entity for redaction that indicates to the server one or more timestamps (e.g., onset and offset times) for occurrences of the named entity.

Turning to the exemplary process 300, in a first step 302, the server receives the indication of the desired keyword and/or redacted keyword, and extracts the posterior probabilities for the desired keyword and/or redact keyword. In a next step 304, the calculates a LB-DTW score for the posterior probabilities according to a previously generated GMM. In a next step 306, the server ranks the resulting LB-DTW scores for each segment, from lowest to the highest. In a next step 308, for some threshold number of segments having the highest (or otherwise optimal or preferred) LB-DTW score, the server calculates a SDTW score. In next steps 310, 312, the server executes a k-nearest neighbor (kNN) algorithm with segments having an SDTW score than an LBDT. The server stores, into a results queue, each segment having an SDTW score comparatively higher (or preferred) than the corresponding LB-DTW score of the segment, until the threshold number (k) segments are in the results queue. In other words, when executing the kNN algorithm in prior steps 310-312 the server looks for segments that satisfy a requirement that the LB-DTW score of a segment is less than the SDTW score of the segment, thereby generating a set of audio segments with LB-DTW score<SDTW score. The set of audio segments contains the threshold number (k) of segments, and represents the audio segments that are more likely to include the desired keyword or redacted keyword entered or selected by the user via the GUI.

Figure 4:
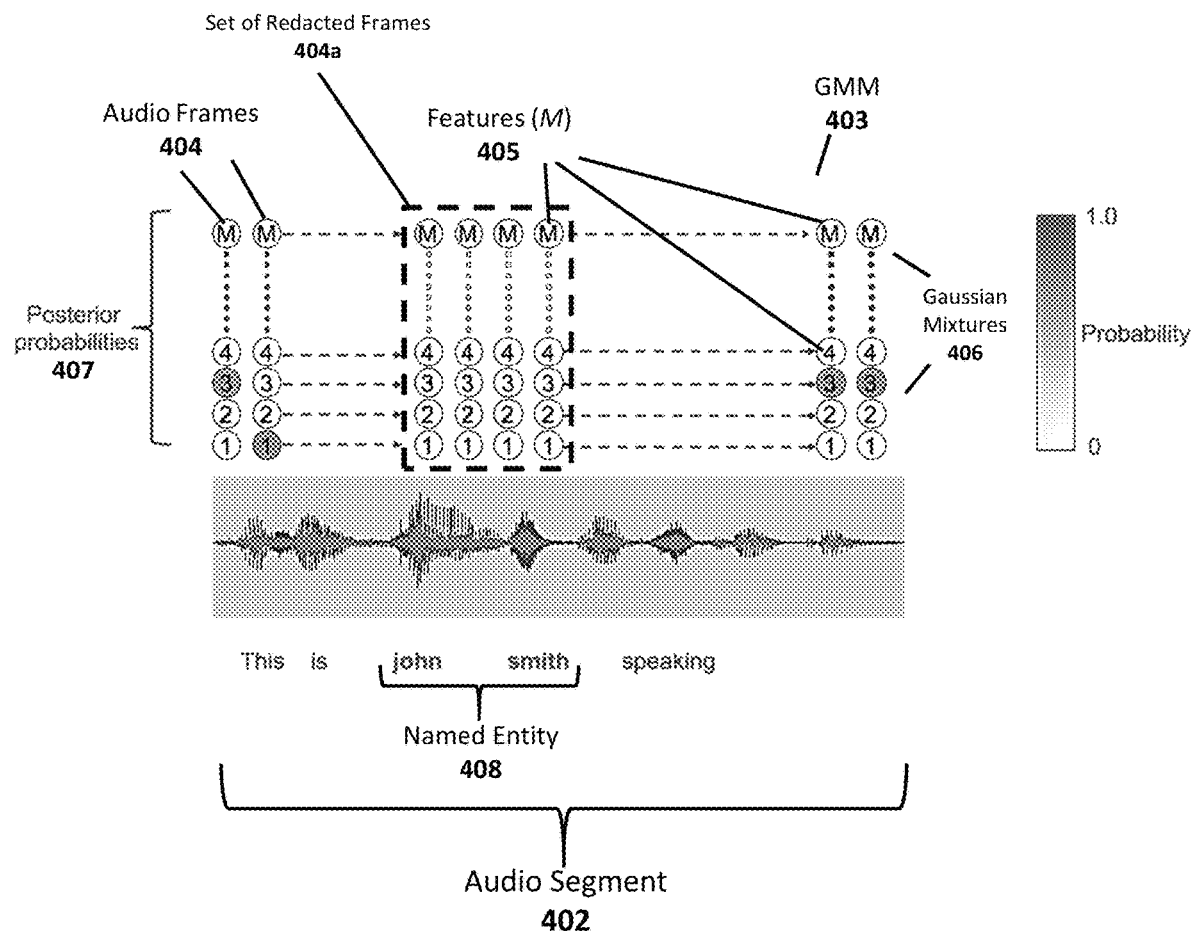
FIG. 4 is a diagram showing a representative visualization of redaction during post-processing.

FIG. 4 shows a diagram showing a representative visualization of redaction during post-processing. An analysis server may generate an audio segment 402 parsed from an audio signal and further generate one or more frames 404. Each frame 404 is a portion of the segment 402 and contains certain features (M) 405 for that portion of the segment 402. The analysis server may generate a Gaussian Mixture Model (GMM) 403 for the segment 402, based on the features 405 extracted from the frames 404. The GMM may comprise a set of Gaussian mixtures 406 that model each of the features 405. The server may extract the posterior probabilities 407 for each feature 405 based on the Gaussian mixture 406 having the optimal posterior probability for each frame 404.

When processing the audio segment 402, the server may "redact" a named entity 408 by adjusting the posterior probabilities 407 of the particular frames 404 containing the named entity 408. The server may receive one or more timestamps or other indicator from a client computer (e.g., analyst device) indicating an occurrence of the named entity 408 in the audio segment 402. To redact the named entity 408 indicated by the user input, the server may, for example, assign equal posterior probabilities 407 across all features 405, dimensions, and/or mixtures 406 for a set of redacted frames 404a containing the named entity 408, thereby nullifying or disregarding any affect the posterior probabilities 407 of the redacted frames 404a would otherwise have on the processes and outcomes described herein.

As an example, in FIG. 4, the first column of represents a first frame 404, a second column represents a second frame 404, and so on. In the first column, the number "3" is darkened to represent that a third Gaussian mixture 406 has the highest posterior probability for the features 405 of the first frame 404. Likewise, in the second column, the number "1" is darkened to represent that a first Gaussian mixture 406 has the highest posterior probability for the features 405 of the second frame 404. A set of columns represent a set of redacted frames 404a containing occurrences of a named entity 408 embedded within the audio segment 402. None these columns of redacted frames 404a have darkened numbers, representing that each posterior probabilities are equivalent and that any of the Gaussian mixtures 406 are equally as likely for the features 405 in the redacted frames 404a. Because the server is agnostic as to which mixture 406 is selected for the redacted frames 404a, the server sets equal posterior probabilities so that there is equal probability that any of the Gaussian mixtures 406 could be selected for these features 405.

Figure 5:
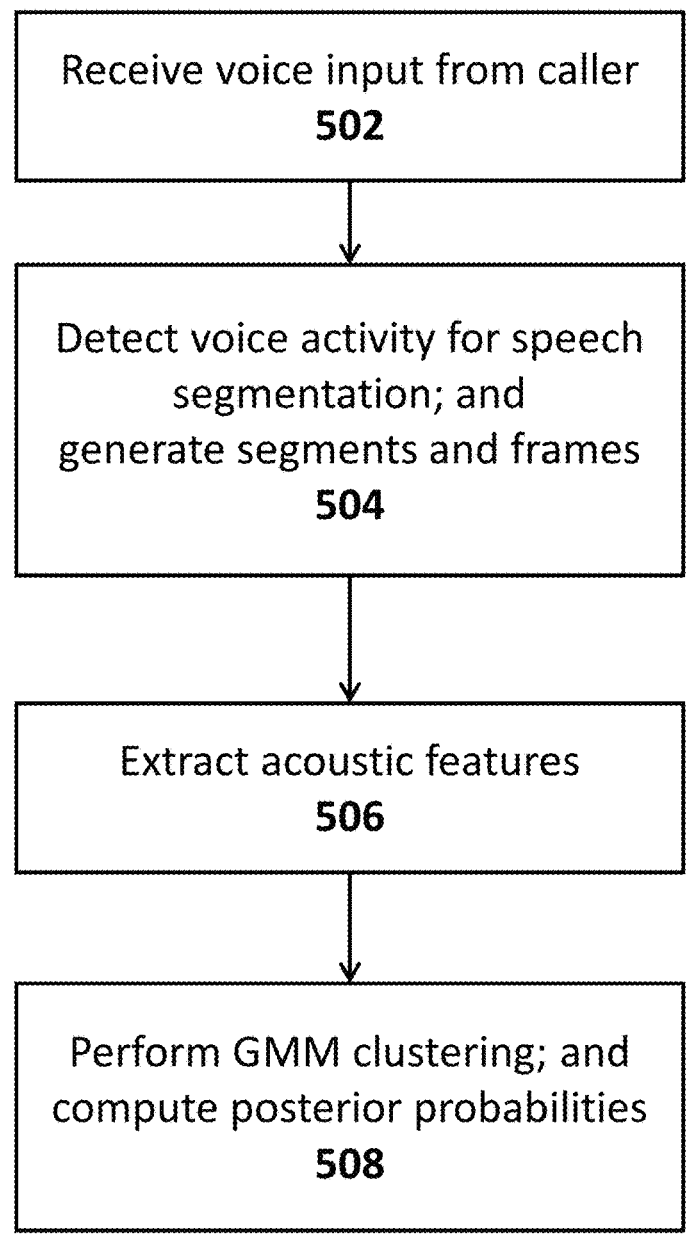
FIG. 5 shows execution steps of audio processing method for a keyword query, according to an exemplary embodiment.

FIG. 5 shows execution steps of audio processing method for a keyword query, according to an exemplary process 500. Although the steps of audio processing in the exemplary process 500 may be performed by multiple computing devices, the following details a single computer implementing the steps. It should also be understood that the steps shown and described herein are merely illustrative and additional, alternative, and fewer number of steps should be considered to be within the scope of this disclosure.

In a first step 502, a server may receive a caller voice input containing an audio speech signal. The caller voice input may be an audio file, a streaming audio, or any other type of speech signal. The speech signal may be stored into a database as an audio file and accessible to a client device (e.g., analyst computer). A user may access and select the audio files or segments from a database using a GUI.

In a next step 504, the server may detect a voice activity region in the caller voice input for speech segmentation. The server may then segment one or more audio segments from the audio signal of the caller voice input. The server may further generate one or more frames from the segments. In some cases, before generating the segments or frames, the voice activity detection of the current step 504 may segment-out or filter-out key segments from superfluous or unhelpful portions of the signal, such as background noise and "dead air." In a next step 506, the server may extract acoustic features from each of the 30 ms audio frame. For example, the server may extract Mel-frequency Cepstral Coefficients (MFCCs) from each audio frame. In a next step 508, the server may cluster the extracted features using a Gaussian Mixture Model (GMM). For each of the clusters, the computer may compute the corresponding posterior probability.

Figure 6:
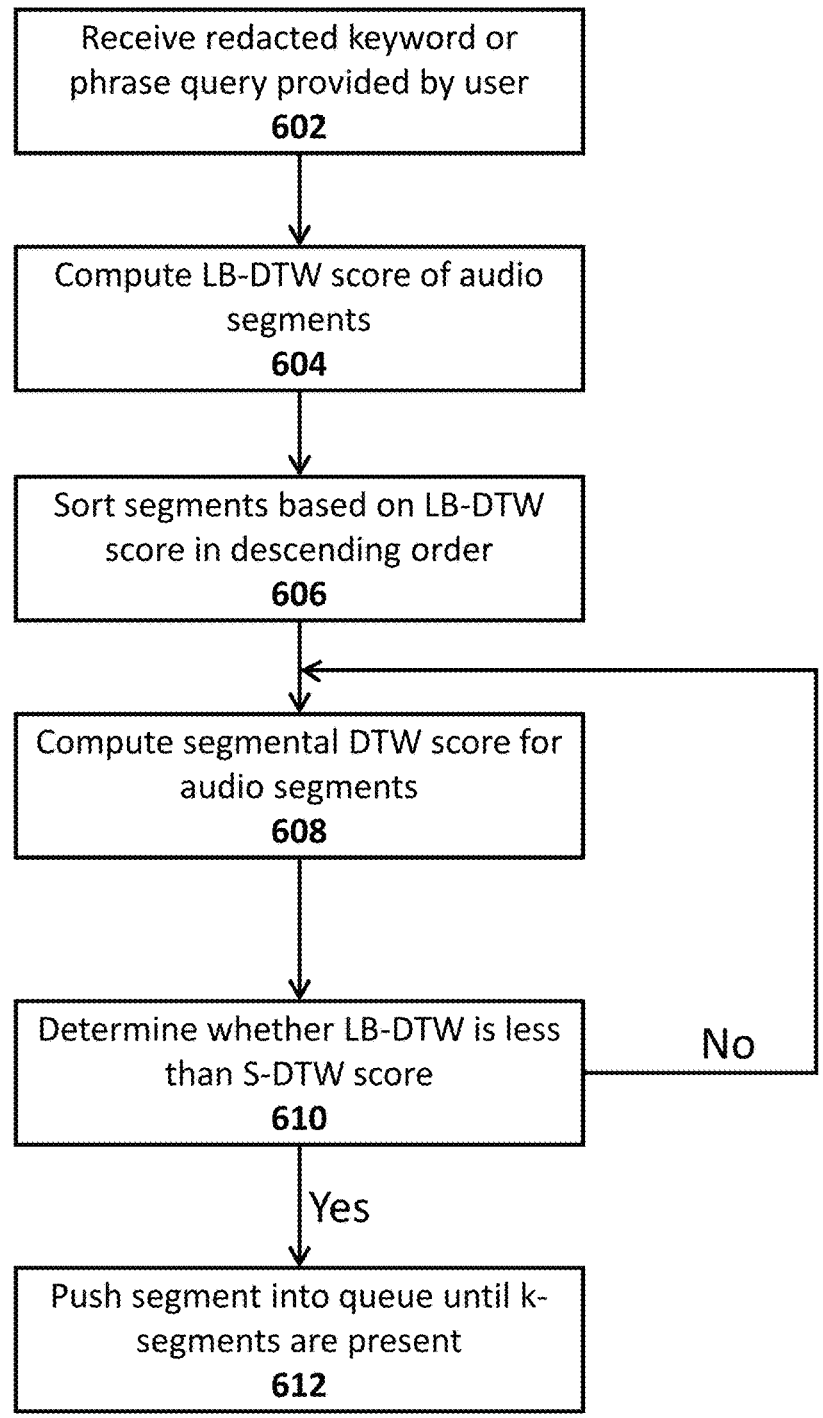
FIG. 6 shows execution steps for a keyword query using an unsupervised keyword spotting (UKWS) process, according to an exemplary embodiment.

FIG. 6 shows execution steps for a keyword query using an unsupervised keyword spotting process 600, according to an exemplary embodiment. Although the steps of the exemplary process 600 may be performed by multiple computing devices, the following details a single computer implementing the steps. It should also be understood that the steps shown and described herein are merely illustrative and additional, alternative, and fewer number of steps should be considered within the scope of this disclosure.

In a first step 602, the server may receive a named entity from the user device. In operation, after the server extracts the posterior probabilities, as in an above exemplary processes 300, 500, the user can then select, in a GUI, a keyword (having one or more words) of interest to be searched for by the server. The client computer (e.g., analyst computer) may transmit to the server indicators of instances of the selected keyword in segments or signals, such as one or more timestamps (e.g., onset and offset times) indicating when the selected keyword occurs. The user then selects, in the GUI, a region within the selected keyword contains a named entity or redacted keyword having one or more words. The client computer may transmit to the server indicators of instances of the named entity in segments or signals, such as one or more timestamps (e.g., onset and offset times) indicating when the named entity occurs.

At next step 604, the server may compute similarity scores using a dynamic time warping (DTW) algorithm for each of the audio segments. In the exemplary process 600, for instance, the server may execute a lower-bound dynamic time-warping (LB-DTW) algorithm to calculate LB-DTW scores for each of the audio segments.

At next step 606, the server may sort or rank the audio segments based upon each segment's respective similarity score (e.g., LB-DTW score). In some instance, the server may sort the audio segments in a descending order, starting with the comparatively lowest LB-DTW score to the comparatively highest LB-DTW score.

At a next step 608, the server may compute a second similarity score using a second DTW algorithm that is different from the DTW algorithm executed in prior step 604 for all segments or some subset of the audio segments. In the exemplary process 600, for instance, the server may execute a segmental dynamic time-warping (SDTW) algorithm to calculate SDTW scores for a subset of audio segments having an LB-DTW score that satisfies a given threshold. In some implementations, this threshold may be fixed or hard-coded; and in some implementations, this threshold may be received from a client computer according to a user input entered at a user GUI.

At a next step 610, the server may determine whether a first similarity score is less than the second similarity score for the audio segments in the subset identified in prior step 608. As an example, for each audio segment in the subset, the server may compare the LB-DTW scores of a particular audio segment against the corresponding SDTW score of the segment, then determines whether the LB-DTW score is lower than the SDTW.

If the server determines that the first similarity score (e.g., LB-DTW score) is less than the second similarity score (e.g., SDTW score) for a given segment, the server may, in step 612, store the segment into a results queue. It should be appreciated that the results queue may be embodied in any computer-readable storage medium, such as volatile storage (e.g., memory) and non-volatile memory (e.g., hard disk); and the storage medium may be located on any computing device in communication with the server or the server itself.

If the server determines that the first similarity score (e.g., LB-DTW score) is more than the SDTW score, the server may execute step 608 to compute SDTW score for a next segment (e.g., next test segment, next query segment). Therefore, the server may cycle through the steps 608, 610, and 612 until there are k segments in the result queue. These k-segments represent the segments that are more likely to have the keyword query received from the user.

Exemplary Processes for Word Discovery

Figure 7:
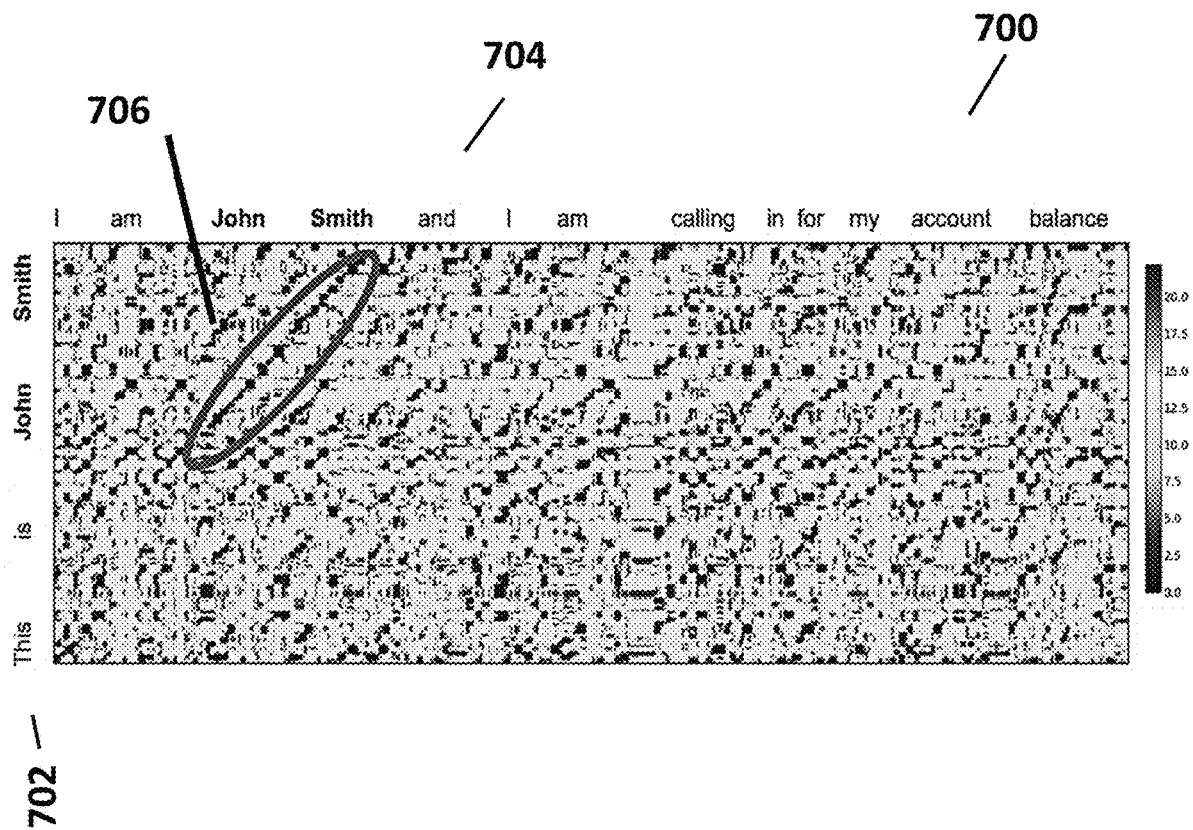
FIG. 7 shows a distance matrix for posteriorgram representations of two utterances.

FIG. 7 shows a distance matrix 700 for the posteriorgram representations of two utterances, where the first utterance 702 is "This is John Smith" and the second utterance 704 is "I am John Smith and I am calling in for my account balance." The values of the matrix 700 represent the "distance" (level of similarity or difference) between the features of the frames. Lower values indicate there is a smaller distance between the posteriorgrams of the respective frames, suggesting there is a higher similarity between the features of the frames.

A region of interest 706 (annotated in FIG. 7 by an ellipse) is the region of the matrix 700 containing values with low distances in adjacent frames and time indexes, which a server (or other computing device of the system) will detect as having the same keyword. The server will link these two utterances as having the same keyword that logically connects the segments or frames containing such utterances. In this example, the linking or connecting phrase identified by the server is "John Smith." When executing UWD processes, the server is using the posterior probabilities (represented as posteriorgrams in FIG. 7) to detect a diagonal or quasi-diagonal region of interest 706 having a sufficient duration that indicates a match of a keyword in two or more utterances.

Figure 8:
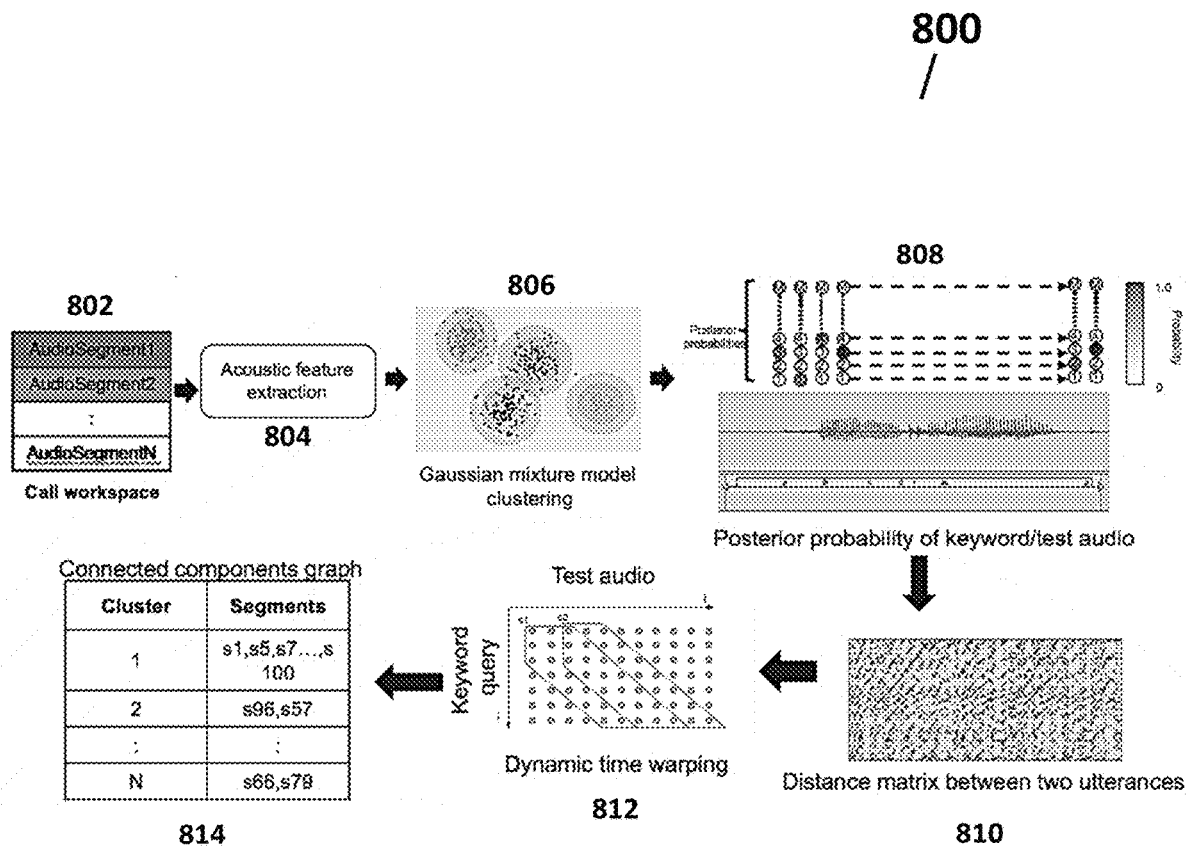
FIG. 8 shows the steps for unsupervised word discovery (UWD), according to an exemplary process.

FIG. 8 shows the steps for unsupervised word discovery (UWD), according to an exemplary process 800. Although the steps of the exemplary process 800 may be performed by multiple computing devices, the following details a single computer implementing the steps. It should also be understood that the steps shown and described herein are merely illustrative and additional, alternative, and fewer number of steps should be considered to be within the scope of this disclosure.

In a first step 802, the server generates audio segments for an audio signal. In some implementations, the server may execute a voice detection software module that detects utterances, and may reduce background noise and "dead air." These audio segments may then be parsed into audio frames having co-equal length.

In a next step 804, mel-frequency cepstral coefficients (MFCCs), from a 30 ms Hamming window with 10 ms overlap, are extracted from audio segments, which may be represented in a call workspace GUI of user. In step 806, the server clusters the features (e.g., MFCCs) using a 50-component GMM, and, in step 808, the posterior probabilities are extracted for the audio segments using the GMM. Similar to the discussion for FIG. 7, in step 810, the server-executed UWD processes are configured to detect a quasi-diagonal region of a sufficient duration that indicates a match of a keyword (having one or more words) in the two utterances (signals or segments). In a next step 812, the server uses a DTW algorithm (e.g., LB-DTW) to generate a similarity score (e.g., LB-DTW score) to generate an approximation of the degree of closeness or distance between the two utterances. In order to detect the quasi-diagonal pattern, a window of one second along the time axis of the query utterance is used and the time index corresponding to the minimum value (e.g., minimum distance value) of the similarity (e.g., LB-DTW) score is stored. In order to ensure spurious regions such as silence or non-speech segments are not clustered, the window of search is shifted by 200 milliseconds in the query segment and the time index corresponding to the minimum value of the LB-DTW score is stored.

In step 814, matches are identified, connected, and stored by the server. A match is considered when the LB-DTW score is below a threshold score and there are a threshold number of matches for a given query segment. After comparing every segment to all other segments in the call workspace, a graph is constructed using the matching criteria described above. Segments are clustered based on multiple pairwise matches for any number applications downstream. In some embodiments, the pairwise matches may be stored in a database as matched data for later retrieval.

When comparing a query segment against a test segment, pairwise matches indicate a similar acoustic region within signals. The computer identifies one or more pairwise matches in a first set of audio segments (e.g., query segment) and a second set of audio segments (e.g., test segment), based on identifying matches a threshold number of matches between the first set of audio segments and the second set of audio segments, using one or more dynamic time-warping algorithms. In some cases, the computer further identifies a similar acoustic region by considering a time index factor, such that the similar acoustic region is defined by one or more time indexes and the pairwise matches occurring at the time indexes.

Figure 9:
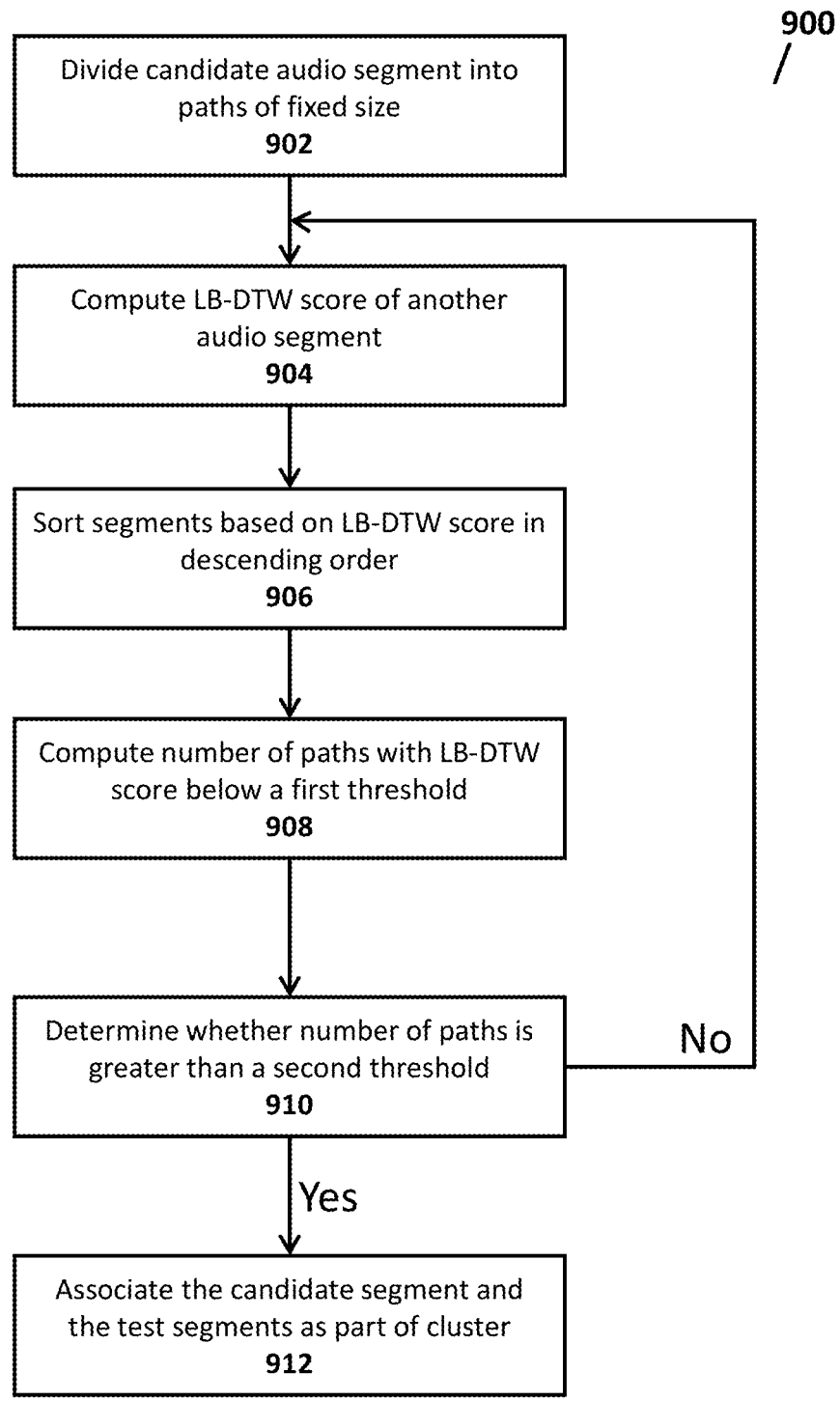
FIG. 9 shows execution steps of a word discovery process, according to an exemplary embodiment.

FIG. 9 shows execution steps of a word discovery process 900, according to an exemplary embodiment. Although the steps of the word discovery process 900 may be performed by multiple computing devices, the following details a single computer executing the steps. It should also be understood that the steps shown and described herein are merely illustrative. Additional, alternative, and fewer number of steps should be considered within the scope of this disclosure. In some embodiments, the computer may execute an audio processing method (e.g., audio processing method 400 in FIG. 4, described above) prior to executing the word discovery method.

In a first step 902, a computer, such as an analysis server, may parse a candidate audio segment into one or more paths of a fixed size, forming a fixed-length portion of a segment. The candidate segment is a segment selected by the computer for comparison against the other segments in an audio signal. A path parsed from the candidate segment refers to a sub-segment or a portion of the audio segment, such as a frame. For example, a path may be a one-second long portion within the candidate audio segment.

At a next step 904, the computer may compute a lower bound dynamic time warping (LB-DTW) score of another audio segment (also referred to as a "test audio segment" or "test segment"). The computer may further compute a LB-DTW score for each of the paths parsed from the candidate segment based upon comparing a corresponding path with the test audio segment.

At a next step 906, the computer sorts the paths based upon the corresponding LB-DTW scores in, for example, descending order.

At a next step 908, the computer identifies a set of paths having LB-DTW scores below a matching threshold and computes the number of paths in the set. In some implementations, the first threshold may be automatically determined by the computer; and in some implementations, the first threshold may be established according to an input from user.

At decision step 910, the computer determines whether the number of paths (having a LB-DTW score below the threshold) in the set is greater than a predefined second threshold number (N). In some implementations, the second threshold may be automatically determined by the computer; and in some implementations, the second threshold may be established according to an input from user.

For steps 908 and 910, in some implementations, the server may compare two speech segments using a sliding window across a time axis for a test segment, using variable length test segments or fixed-length test segments. In step 908, the computer is determining whether the quality of the matches between sub-portions of the test segment and the query segment at the time index. For example, a query segment may be "I would like to know the balance of the account." For a fixed-length comparison, the test segments would include "I'd like to," so the server would compare "I would like to know the balance of the account" (query segment) against "I'd like to" (test segment). For variable-length comparison, the test segments across the time axis would be "I'd like to" and "I'd like to know." So when the server determines there is a comparatively good match between "I would like to know the balance of the account" and "I'd like to" at that time window, the server then compares "I would like to know the balance of the account" against "I'd like to know." In step 910, the server is determining the quality of the match between the test segment and query segment based on the quality of the various sub-portions from step 908.

If the computer determines, in step 910, that the number of paths in set is lower than the second threshold (N), then computer may loop back to step 904. The computer then selects a new test audio segment and executes the previous steps 904, 906, 908 on the newly selected test segment.

If the computer determines, in step 910, that the number of paths in the set is higher than the second threshold (N), the computer executes a next step 912, in which the computer associates the candidate audio segment and the test audio segment as part of a cluster.

The computer may execute the exemplary process 900 for each candidate audio segment in the audio signal, in order to identify corresponding test audio segments likely having similar acoustic regions as each of the candidate audio segments.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   generating, by a computer, a plurality of audio frames from a plurality of audio signals;
   clustering, by the computer, one or more features of each audio frame according to a modeling algorithm, thereby generating one or more models for each frame;
   extracting, by the computer, posterior probabilities for each of the one or more features of each audio frame extracted from the audio frames according to the one or more models;
   receiving, by the computer, from a client computer a keyword indicator for a keyword to query in the audio signals, the keyword comprising one or more words;
   receiving, by the computer, from the client computer a named entity indicator for a named entity to be redacted from the query, wherein the computer nullifies the posterior probability of each frame containing the named entity;
   calculating, by the computer, for each audio frame containing the keyword, a first similarity score and a second similarity score, the first similarity score and the second similarity score of an audio frame calculated using a model selected for the respective frame based on the posterior probability of the audio frame;

storing, by the computer, into a queue, a subset of audio frames having a second similarity score comparatively higher than a corresponding first similarity score, the subset containing a review-threshold amount of audio frames; and generating, by the computer, a list of audio segments of the audio signals matching the keyword, the list of audio segments containing at least one of the audio frames in the subset.

2. The method of claim 1, wherein the first similarity score is a lower-bound dynamic time warping score calculated by the computer using a lower-bound dynamic time-warping algorithm.

3. The method of claim 1, wherein the second similarity score is a segmental dynamic time warping score calculated by the computer using a segmental dynamic time-warping algorithm.

4. The method of claim 1, wherein the keyword indicator received from the client computer includes one or more timestamps indicating to the computer when instances of the keyword occur in at least one audio signal.

5. The method of claim 1, wherein the named entity indicator received from the client computer includes one or more timestamps indicating to the computer when instances of the named entity occur in at least one audio signal.

6. The method of claim 1, further comprising receiving, by the computer, from the client computer a review-threshold indicator indicating the review-threshold amount of audio frames in the subset.

7. The method of claim 1, further comprising transmitting, by the computer, to the client computer the list of audio segments matching the keyword, the list of audio segments containing the review-threshold amount of audio segments.

8. The method of claim 1, further comprising identifying, by the computer, for each segment in the list, one or more timestamps indicating when instances of the keyword occur in the segment, wherein the list transmitted to the client computer includes each timestamp associated with the one or more segments of the list.

9. The method of claim 1, further comprising generating, by the computer, one or more segments for each of the audio signals, wherein each segment comprises at least one frame.

10. The method of claim 9, wherein the one or more segments of each audio signal are generated according to a voice-activated detection module configured to detect a segment.

11. A computer-implemented method comprising:
segmenting, by a computer, a first audio signal into a first set of one or more audio segments, and a second audio signal into a second set of one or more audio segments, at least one audio signal including a named entity associated with a named entity indicator;

generating, by the computer, sets of one or more paths for each audio segment in the first set of audio segments, and sets of one or more paths for each audio segment in the second set of audio segments;

calculating, by the computer, based on lower-bound dynamic time-warping algorithm, a similarity score for each path of each audio segment of the first set of audio segments, and for each path of each audio segment of the second set of audio segments, wherein the computer nullifies the similarity score of each path containing the named entity according to the named entity indicator; and identifying, by the computer, at least one similar acoustic region between the first set of audio segments and the second set of audio segments, based upon comparing the similarity scores of each path of each segment of the first set of audio segments against the similarity scores of each path of each segment of the second set of audio segments.

12. The method of claim 11, wherein each path is a fixed-length portion of an audio segment.

13. The method of claim 11, further comprising:
clustering, by the computer, one or more features of each path of each segment in a similar acoustic region according to a modeling algorithm, thereby generating one or more models for each path; and extracting, by the computer, posterior probabilities for each of the one or more features of extracted from the audio paths according to the one or more models, wherein the similarity score for each respective path is calculated using a model selected for the respective path based on the posterior probability of the respective path.

14. The method of claim 13, further comprising receiving, by the computer, from a client computer a named entity indicator indicating to the computer an instance of the named entity in at least one audio signal, wherein the computer nullifies the posterior probability of each path containing the named entity for clustering.

15. The method of claim 11, wherein comparing the similarity scores further comprises:
selecting, by the computer, from the second set of audio segments a first test segment at a first time index and defined by a first time window;

comparing, by the computer, the similarity scores for the paths of the first test segment against the similarity scores for the paths of at least one query segment of the first set of audio segments, according to the first time window and the first time index;

selecting, by the computer, from the second set of audio segments a second test segment at a second time index and defined by a second time window; and comparing, by the computer, the similarity scores for the paths of the second test segment against the similarity scores for the paths of the at least one query segment, according to the second time window and the second time index.

16. The method of claim 11, wherein identifying a similar acoustic region further comprises:
identifying, by the computer, a first-level match between a query segment of the first set of audio segments and a test segment of the second set of audio segments, based on determining that a minimum distance value between the similarity scores for the paths of the query segment and the similarity scores for the paths of the test segment satisfies a first-level threshold.

17. The method of claim 16, further comprising identifying, by the computer, a second-level match between the query segment of the first set of audio segments and the test segment of the second set of audio segments, based on determining that a number of first-level matches satisfies a second-level threshold.

18. The method of claim 17, further comprising:
identifying, by the computer, one or more pairwise matches in the first set of audio segments and the second set of audio segments, based on identifying each second-level match between the first set of audio segments and the second set of audio segments, wherein the similar acoustic region is defined by at least one time index and at least one pairwise match at the at least one time index, and wherein the computer includes each of the pairwise matches of the similar acoustic region in the clustering.

19. The method of claim 18, further comprising storing, by the computer, into a database, matched data comprising each of the pairwise matches for each similar acoustic region identified by the computer and time indexes corresponding to each of the pairwise matches.

20. The method of claim 16, further comprising:
determining, by the computer, that a number of first-level matches between the query segment and the test segment fails to satisfy a second-level threshold; and
selecting, by the computer, a next test segment of the set of second audio segments to compare against the query segment.

\* \* \* \* \*